United States Patent [19]

McRae

[11] 4,233,683
[45] Nov. 11, 1980

[54] CASCADED EQUALIZER TECHNIQUE

[75] Inventor: Daniel D. McRae, West Melbourne, Fla.

[73] Assignee: Harris Corporation, Cleveland, Ohio

[21] Appl. No.: 873,912

[22] Filed: Jan. 31, 1978

[51] Int. Cl.³ .............................................. H03H 7/30
[52] U.S. Cl. ........................................ 375/14; 333/18
[58] Field of Search .................. 364/724, 825; 325/42, 325/323, 324; 333/18; 375/11, 12, 14, 99, 103

[56] References Cited

U.S. PATENT DOCUMENTS

| | | | |
|---|---|---|---|
| 3,928,755 | 12/1975 | Bellanger et al. | 364/724 |
| 3,967,102 | 6/1976 | McCown | 364/724 |
| 3,987,288 | 10/1976 | Franks | 364/724 |
| 4,038,536 | 7/1977 | Feintuch | 364/724 |

*Primary Examiner*—Benedict V. Safourek
*Attorney, Agent, or Firm*—Craig & Antonelli

[57] ABSTRACT

Equipment-generated and dynamic crosstalk are effectively compensated by a signal equalization technique which involves the cascading of equalizers of respectively different lengths and respectively different loop gains. The first equalizer to which a received data sequence is applied is a long equalizer having a large number of stages, the term long being relative to the time dispersion of the high frequency channel. The gain of this long equalizer is adjusted to a low value that is consistent with the basic acquisition requirements of the transmission system, but is such that it averages through rapid variations of the high frequency channel. The second equalizer is short relative to the first but is sufficiently long to cover the span of the time dispersion of the high frequency channel.

The first equalizer includes a data storage device which receives and stores successively received data samples. Each data sample is multiplied by a controllable weighting factor and the weighted samples are summed to provide an estimate of a received data signal. This estimate is then supplied to the second equalizer which may either be of the form of a transversal equalizer, like the first, or a decision-configured equalizer. At the output of the second equalizer there is obtained a second estimate which is compared with a reference value to form an error signal. The error signal is correlated with the data stored in the first and second equalizers in order to update the weighting factors of the respective equalizer. The reference value can be a preset value or one determined from the data. The gain factor for correlating the error signal with the data stored in the second equalizer is considerably greater (at least an order of magnitude and preferably two or more orders of magnitude) than that for the first equalizer.

13 Claims, 3 Drawing Figures

CASCADED EQUALIZER TECHNIQUE

FIELD OF THE INVENTION

The present invention relates to a technique of reducing the adverse effects of crosstalk in a data communication system. The invention is particularly directed to a scheme for tracking both dispersive fades, such as those that might occur in a high frequency channel, as well as rapid variations caused by the channel, which scheme involves cascading equalizers of different lengths and differing loop gains.

BACKGROUND OF THE INVENTION

In present-day communications systems, data transmitted over a high frequency channel is often subjected to degradation imparted by crosstalk. One form of crosstalk is produced by the equipment and, while it may differ from call to call, it is generally fixed for the duration of a particular call. To permit satisfactory signalling under these circumstances, a long or large multi-stage equalizer is required; however, the equalizer gain may be limited to a value which prevents the equalizer from tracking rapid variations caused by the high frequency channel. These rapid variations form a second form of crosstalk which must be compensated for an acceptable error rate in the data recovery process.

Unfortunately, conventional equalization schemes do not provide the necessary corrective action for both forms of crosstalk. Instead, basic prior art systems merely involve a conventional equalization scheme or simple cascaded schemes which are essentially further iterations of the basic equalization process. For example, the U.S. Patents to Sha et al, No. 3,708,766, and No. 3,716,807, disclose a system comprised of a plurality of identically configured equalizers connected in cascade. Successive iterations of equalizer weight adjustment procedures are carried out in an effort to reduce the distortion at the initial stage to zero. Cascaded or multiple equalization schemes are also disclosed in the U.S. Patents to Winters, No. 3,649,916 and Hirsch, No. 3,648,171. However, like the systems described in the patents to Sha et al, these systems do not carry out the dual crosstalk reduction process achieved in accordance with the present invention, summarized briefly below.

SUMMARY OF THE INVENTION

In accordance with the present invention, both equipment-generated and dynamic crosstalk can be effectively compensated by a signal equalization technique which involves the cascading of equalizers of respectively different lengths and respectively different loop gains. The first equalizer to which a received data sequence is applied is a long equalizer having a large number of stages, the term long being relative to the time dispersion of the high frequency channel. The gain of this long equalizer is adjusted to a low value that is consistent with the basic acquisition requirements of the transmission system, but is such that it averages through rapid variations of the high frequency channel. The second equalizer is short relative to the first but is sufficiently long to cover the span of the time dispersion of the high frequency channel.

The first equalizer includes a data storage device which receives and stores successively received data samples. Each data sample is multiplied by a controllable weighting factor and the weighted samples are summed to provide an estimate of a received data signal. This estimate is then supplied to the second equalizer which may either be of the form of a transversal equalizer, like the first, or a decision-configured equalizer. At the output of the second equalizer there is obtained a second estimate which is compared with a reference value to form an error signal. The error signal is correlated with the data stored in the first and second equalizers in order to update the weighting factors of the respective equalizer. The reference value can be a preset value or one determined from the data. The gain factor for correlating the error signal with the data stored in the second equalizer is considerably greater (at least an order of magnitude and preferably two or more orders of magnitude) than that for the first equalizer.

DETAILED DESCRIPTION

Figure 1:
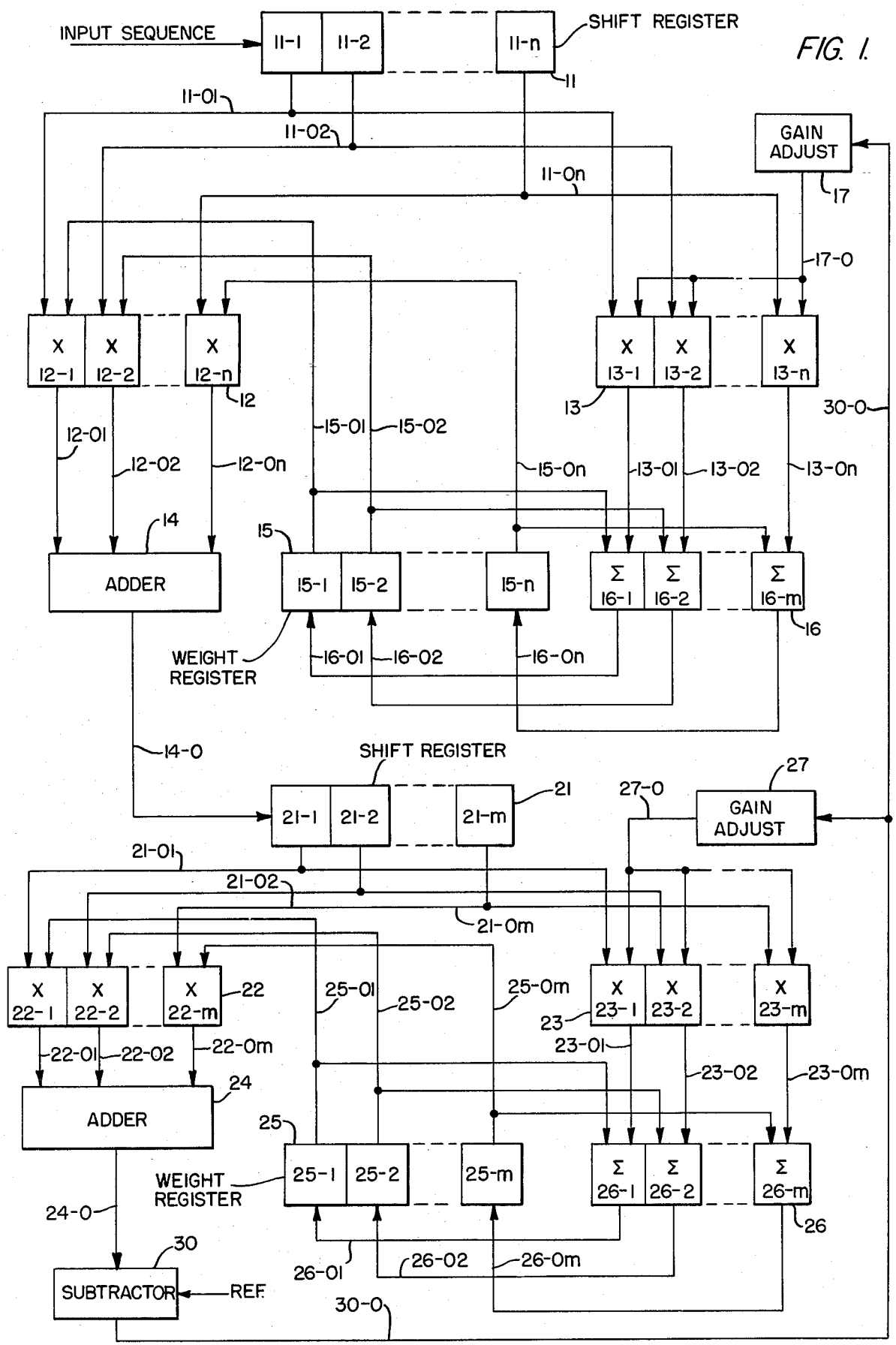
FIG. 1 is a schematic block diagram of an embodiment of a cascaded differential gain/length equalizer arrangement employing a pair of transversal equalizers.

Referring now to FIG. 1, there is shown an embodiment of the invention comprised of a pair of cascaded equalizers of different lengths and different loop gains. Although the description of the invention to follow will be directed to an exemplary digital embodiment, it is to be understood that the cascaded equalizing technique is equally applicable to an analog implementation.

The first, or long, equalizer is shown in the upper portion of FIG. 1, while the second, or short, equalizer is illustrated in the lower portion of the Figure. Initially, a series of data signal samples suitably encoded in digital format are supplied to a shift register 11. Shift register 11 is comprised of a relatively large number n of stages 11-1 to 11-n, as compared with the number m of stages 21-1 to 21-m of the data estimate storage register 21 of the second equalizer. For example, sample storage register 11 may be of a size n sufficient to store two hundred fifty-five successive samples, while register 21 may store only on the order of ten to fifteen data estimates. These numbers are not limitative of the invention and are merely given to illustrate a relative exemplary differential relationship between the lengths of the respective equalizers. It is also to be understood that each stage of registers 11 and 21 contains the appropriate number of digital circuit stages to accomodate the number of bits into which each data sample and data estimate may be encoded. Thus, while the parallel outputs 11-O1 to 11-On and 21-O1 to 21-Om of each stage of registers 11 and 21 are illustrated in FIG. 1 by single lines, it will be appreciated by those skilled in the art that these lines may include multi-conductor leads corresponding to the plural bits into which each data sample and data estimate word is encoded. Similarly, the remaining lead connections shown in FIG. 1 are to be understood to be representative of the appropriate number of conductor leads for coupling encoded digital signals between respective circuit elements.

The contents of each respective stage 11-1 to 11-n of data sample storage shift register 11 are coupled in parallel over lines 11-O1 to 11-On to the respective stages 12-1 to 12-n and 13-1 to 13-n of multipliers 12 and 13. Each multiplier 12 and 13 comprises a plurality of multiplier stages equal in number to the number of storage stages of register 11. A second input of each multiplier stage of multiplier 12 is coupled over lines 15-O1 to 15-On to a respective output of weight register 15. Weight register 15 includes a plurality of stages 15-1 to 15-n each of which stores a digital value representative of a variable weighting factor. Initially, these factors may be derived during a pre-data transmission training interval or may otherwise be preset. The contents of the stages 15-1 to 15-n of register 15 are also coupled to the respective adder stages 16-1 to 16-n of adder 16 to be added to the contents of the stages of multiplier 13. The outputs of adder stages 16-1 to 16-n are coupled over lines 16-O1 to 16-On to the inputs of weight register 15 for updating the weight factor values stored in registers 15-1 to 15-n. A second input of each stage 13-1 to 13-n of multiplier 13 is coupled to the output 17-O of a gain adjust circuit 17 which scales the error signal on line 30-O by a prescribed factor. For this purpose, gain adjust circuit 17 may comprise a simple divider circuit. The outputs of the stages 13-1 to 13-n of multiplier 13 are coupled over lines 13-O1 to 13-On to adder 16 which, together with multiplier 13, forms a first correlator for correlating the error signal produced from the short or second equalizer with the data stored in register 11, for the purpose of updating the equalizer weights stored in register 15. The outputs of multiplier 12-1 to 12-n are supplied over lines 12-O1 to 12-On and summed together in adder 14, the output of which may be considered to represent a first estimate of the value of the data sample stored in the middle stage of register 11.

The output of adder 14 is supplied over line 14-O to shift register 21 which constitutes the estimate storage register for the second equalizer. The contents of the respective stages 21-1 to 21-m of register 21 are coupled over lines 21-O1 to 21-Om to the respective multiplier stages 22-1 to 22-m of multiplier 22 and the respective multiplier stages 23-1 to 23-m of multiplier 23. The number of multiplier stages in each multiplier 22 and 23 is equal to the number of stages in register 21. A second input of each multiplier stage of multiplier 22 is coupled over lines 25-O1 to 25-Om to a respective output of weight register 25. Weight register 25 is formed of a plurality of storage stages 25-1 to 25-m each of which stores a digital value representative of a variable weighting factor. As is the case with the weights stored in weight register 15, the values stored in register 25 may be initially derived during a pre-data transmission training interval or may be otherwise preset. The contents of the stages 25-1 to 25-m of weight register 25 are also coupled to the respective adder stages 26-1 to 26-m of adder 26 to be added to the contents of the stages of multiplier 23. The outputs of adder stages 26-1 to 26-m are coupled over lines 26-O1 to 26-Om to the inputs of weight register 25 for updating the weight factor values stored in registers 25-1 to 25-m. Adder stages 26-1 to 26-m cause the contents of the stages 25-1 to 25-m of register 25 to be updated by adding thereto the outputs of multiplier stages 23-1 to 23-m which are coupled to adder 16 over lines 13-O1 to 13-Om. Multiplier 13 multiplies the estimated data values stored in register 21 by a scaled value of the error signal in line 30-O. For this purpose, gain adjust circuit 27 may comprise a divider for scaling the error signal by a preselected gain constant and supplying the scaled error signal over line 27-O to multiplier 23. Multiplier 23 and adder 26 form a correlation for correlating the error signal on line 30-O with the data estimates stored in register 21. The amount by which gain adjust circuit 27 scales the error signal is considerably less than the scaling factor of gain adjust circuit 17 and may be on the order of two orders of magnitude or more smaller than the amount by which gain adjust circuit divides its input error signal. Namely, the loop gain of the second equalizer may be at least two orders of magnitude greater than the loop gain of the first or long equalizer.

For providing a second estimate of the data, the weighted data estimates obtained from the multiplier stages 22-1 to 22-m of multiplier 22 are coupled over lines 22-O1 to 22-Om to be summed in adder 24. The output of adder 24 may be considered to represent an equalization of the data estimate stored in the middle stage of register 21 and this summation estimate is compared in subtractor 30 with a reference value REF, which may be either predetermined or based upon the data itself. Taking a very simple case of the transmission of straightforward binary symbols, for example, represented by prescribed fractions of a volt, the reference value could be set halfway between zero and equal excursions of opposite polarity. Namely, for an exemplary case where the transmitted data is either $+1.0$ volts for a logical one and $-1.0$ volts for a logical zero, the output of adder 24 could be compared with a digitized representation of $+0.5$ volts for summation values of a positive polarity and with a digitized representation of $-0.5$ volts for summation values of a negative polarity, the difference between the summation value and the reference being the error signal on line 30-O. This error signal would then be used in the correlators of the first and second equalizers to update the stored weights.

OPERATION

The operation of the cascaded equalizer configuration shown in FIG. 1 is such that the first, or long, equalizer weighting coefficients stored in register 15 vary at an extremely slow rate relative to those stored in register 25 of the second, or short, equalizer by virtue of the differential gain imparted by gain adjusting circuit 17 relative to that of gain adjusting circuit 27.

Now, prior to equalization of an unknown data stream, weighting coefficients will have been set in registers 15 and 25 either on the basis of a prescribed algorithm defining known communication parameter variables, or through a training data sequence. A training data sequence is an often employed technique because it allows a relatively accurate presetting of system variables immediately prior to the data transmission, so as to improve upon the accurracy of estimated crosstalk influence. As received samples are sequentially supplied to register 11, they are successively advanced from stage 11-1 to stage 11-n by appropriate receiver symbol timing pulses, not shown, as the equalization operation of the system is carried out for each respective sample.

During the processing operation, each stage 11-1 to 11-n of register 11 will contain a data sample to be modified by the cascaded equalization process. The n stages of weight register 15 contain established weighting coefficient values, subject to modification by the first equalization stage correlator. Similarly, shift register 21 will contain estimates based upon the equalization operation of the long equalizer and weight register 25 will contain a set of weighting coefficients to be used for the operation of the second, or short, equalizer.

Now, as a new data sample is supplied to the first stage, stage 11-1, of data sample storage shift register 11, the contents of each stage of the register are shifted over to the next stage, while the contents of stage 11-n are dumped. The data sample values stored in stages 11-1 to 11-n are coupled over lines 11-O1 to 11-On to multiplier 12 and are multiplied by the weighting coefficients stored in the respective stages 15-1 to 15-n of weight register 15 which are supplied to multiplier stages 12-1 to 12-n over leads 15-O1 to 15-On. The resulting products are then summed in adder 14 and the result is coupled over line 14-O as a new data estimate to be shifted into stage 21-1 of shift register 21 as the contents of stages 21-1 to 21-m-1 are shifted into stages 21-2 to 21-m, respectively, the contents of stage 21-m being dumped. The new set of data stored in register 21-1 to 21-m is coupled over lines 21-O1 to 21-Om to multiplier stages 22-1 to 22-m to be multiplied by the weighting coefficients stored in stages 25-1 to 25-m of weight register 25, supplied over lines 25-O1 to 25-Om. The weight coefficient-estimate products are then supplied over lines 22-O1 to 22-Om to adder 24 and summed. The resulting sum, corresponding to the cascaded equalizer output, is also applied over adder output lead 24-O to subtractor 30 to be compared with a reference value. A digital number representative of the difference between the sum on lead 24-O and the reference is then coupled over lead 30-O to gain adjust circuits 17 and 27. Gain adjust circuits scale the difference signal by respectively different factors and supply respective scaled error signals over leads 17-O and 27-O to the multiplier stages of multipliers 13 and 23.

The correlators of the respective equalizers, comprised of multipliers 13 and 23 and adders 16 and 26, respectively carry out correlations for updating the weighting coefficients stored in weight registers 15 and 25. Namely, the product of the contents of each stage of register 11 and the error signal on line 17-O (scaled by gain adjust circuit 17) is added to the weighting coefficient stored in each respective stage of register 15, so that weight register 15 now contains updated (based upon the effect of the new data sample input to shift register 11) weighting coefficients to be used for the next equalization process of the first, or long, equalizer. Similarly, the product of the contents of each stage of register 21 and the error signal on line 27-O (scaled by gain adjust circuit 27) is added to the weighting coefficient stored in each respective stage of register 25, so that weight register 25 now contains updated (based upon the effect of the new estimate input to shift register 21) weighting coefficients to be used for the next equalization process of the second, or short, equalizer.

As was described previously, the ratio of the gain adjustment imparted by gain adjust circuit 27 to that imparted by gain adjustment circuit 17 may be on the order of one hundred or more. This higher loop gain coupled with its relatively shorter length enables the second equalizer to track rapid dispersive fades caused by the high frequency channel; still, the first equalizer has a low gain and is of a length sufficient to permit satisfactory signalling in accordance with the basic acquisition requirements of the transmission system. As a result, during the above-described operation, variations in the weighting coefficients stored in register 25 are not substantially invariable but may change substantially from sample to sample to permit tracking of rapid fluctuations caused by the high frequency channel.

In the embodiment of the invention depicted in FIG. 1, described above, each of the first and second equalizers, although having different lengths and different loop gains, is formed as an inverse filter configured transversal equalizer. While inverse filter configured transversal equalizers perform a useful mean square error inverse filter approach to handling normal crosstalk, they suffer shortcomings when attempting to handle abnormal disturbances such as a null in the frequency response. (The equalizer gain required for a null in the frequency response is infinite.) Since rapidly varying crosstalk in a high frequency channel is a source of nulls in the frequency response, modification of a pure inverse filter implementation, as described above in connection with FIG. 1, is required. In accordance with a second embodiment of the present invention, the second equalizer which is cascaded to receive the data sample estimates from the first relatively long transversal equalizer is a decision-configured device which examines the data sample estimates provided by the first equalizer and, on the basis of a synthesized channel characteristic, decides whether data sample estimates provided by the first equalizer should be changed in order to minimize the mean square error over a prescribed data span. This minimized mean square error is then applied to the first and second equalizers for adjusting the weighting coefficients, as in the case of the first embodiment.

Figure 2:
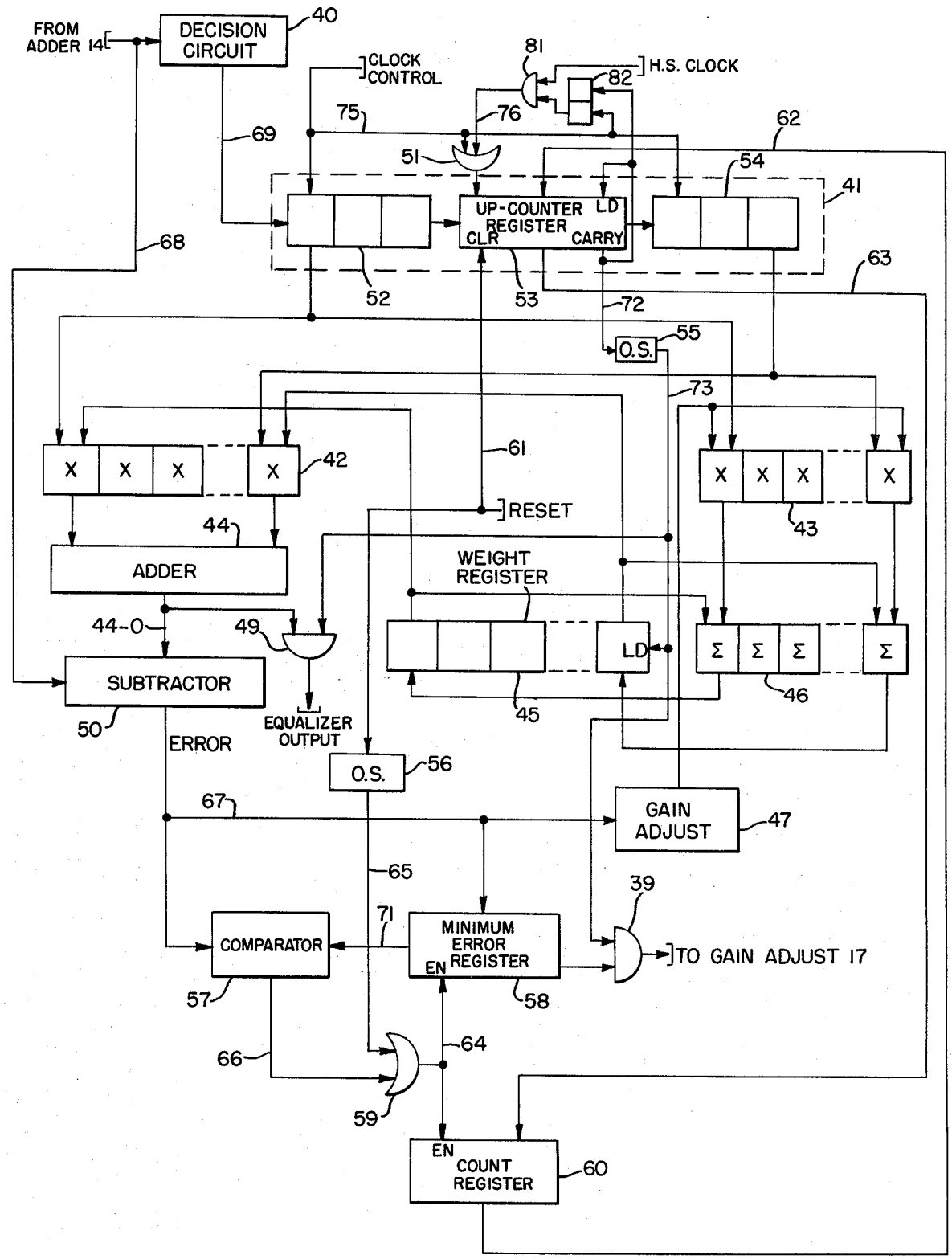
FIG. 2 is a schematic block diagram of a first embodiment of a decision-configured equalizer which may be used for the second or short equalizer in the cascaded equalizer arrangement shown in FIG. 1.

Referring to FIG. 2, there is shown a decision-configured second, or short, equalizer which is coupled to the output of adder 14 and the input of gain adjusted circuit 17 of the first, or long, equalizer, shown in FIG. 1. Rather than being connected directly to the first stage of a data estimate storage register, the output of adder 14 is coupled via line 68 to a decision circuit 40 and subtractor 50. Decision circuit 40 evaluates the digital value of each data estimate on the basis of a prescribed algorithm representative of the set of data values capable of being transmitted. As a simple example, in the case of the transmission of the binary values "0" and "1", represented by some fixed negative voltage level and a fixed positive voltage level, decision circuit 40 may take the form of a polarity detector. For values on line 68 representative of a positive voltage, decision circuit 40 would supply a "1" as the decided-upon data estimate and, for values on line 68 representative of a negative voltage, decision circuit 40 would supply a "0" as the decided-upon data estimate. The output of decision circuit 40 is coupled over line 69 to the first stage of decision estimate storage register 41. Again, as was the case with the schematic circuit diagram illustrated in FIG. 1, the various line connections shown in FIG. 2 do not necessarily represent single conductor leads but may comprise a plurality of leads as necessary to couple the various digital signal codes between the circuit components.

Decision estimate storage register 41 may be formed of a shift register storage device containing a relatively small number of storage stages, such as a nine-stage register, relative to the long storage register 11 of the first equalizer as in the embodiment shown in FIG. 1. Of course, the number of stages is not limited to nine, but may be any appropriate number consistent with the objectives and teachings of the invention. As shown in FIG. 2, these nine stages are separated into groups 52, 53, and 54, each group being composed of three stages. The central group 53 of stages is formed of an up-counter register module, in order that the contents of the central group 53 may be controllably varied, as will be explained subsequently. Shift control pulses for register 41 are supplied over line 75 from a suitable clock control circuit, not shown. In addition, high speed clock pulses are supplied from a higher frequency clock source, not shown, for controlling the cyclical counting operation of central group 53 within the period of a single shift pulse from the clock control. Each of the pulse supply lines is coupled to central group 53 via OR gate 51. Line 61 is coupled to receive a reset or clear signal at the beginning of each complete data estimate processing cycle. The reset signal is also applied to delay circuit or one-shot 56, the output of which is connected over line 65 to one input of OR gate 59.

The contents of each stage of register 41 are respectively coupled to the corresponding multiplier stages of multipliers 42 and 43, just as in the embodiment of the invention shown in FIG. 1. In order to simplify the drawing, the connections from only the first and last stage of register 41 have been shown. Line 63 represents connections from the three stages of group 53 to the input of a count register 60. Count register 60 may be comprised of the same number of stages of group 53 and is employed to store a variable digital count to be supplied over line 62 to the respective stages of group 53 and controllably loaded into the stages of group 53 upon the generation of a carry signal at the end of the up-counting operation of stage group 53. The loading of count register 60 is controlled by a load enable control signal over line 64 at the output of OR gate 59.

The outputs of the multiplier stages 42 and 43 are respectively connected to adders 44 and 46 in the same manner that multipliers 22 and 23 are connected to adders 24 and 26 in the embodiment shown in FIG. 1. The respective stages of adder 46 are also connected to receive the outputs of the stages of weight register 45. The outputs of the stages of adder 46 are, in turn, connected to the inputs of the stages of weight register 45 to update the weighting coefficients. Again, for the purposes of simplifying the drawing connections between the first and last stages, connections for only the first and last stages have been shown. The loading of updated weighting coefficients is effected by a load control signal on line 73, connected to the output of delay or one-shot circuit 55. The input of delay 55 is connected via line 72 to the carry output of stage group 53, so that at the end of a brief interval, subsequent to the completion of the cyclical up-count operation of group 53, the scaled error signal resulting from the equalizer processing of the minimum error producing contents of register 41 may be used to adjust the weighting coefficients of register 45.

The output of adder 44 is supplied, via line 44-0, to subtractor 50, which supplies an output signal over line 67, representative of the difference between the second equalizer output and the data estimate supplied over line 68. This error signal is applied to gain adjust circuit 47, the output of which is connected to an input of each multiplier stage of multiplier 43, in the same manner that the output of gain adjust circuit 27 is connected to multiplier 23, in FIG. 1. Also, like gain adjust circuit 27, the gain imparted by circuit 47 may be on the order of two orders of magnitude greater than the gain of gain adjust circuit 17. The error signal on line 67, is coupled to comparator 57 and minimum error register 58. Comparator 57 compares the error signal on line 67 with the error value stored in register 58 and generates an output signal if the value of the error on line 67 is smaller than that on line 71. This output signal is coupled over line 66 to a second input of OR gate 59, so as to cause register 58 to replace its contents with the error value on line 67 and to cause register 60 to replace its contents with the contents of up-counter 53. The contents of register 58 are also coupled to gain adjust circuit 17 (FIG. 1) via gate 39.

The operation of the decision-configured short equalizer illustrated in FIG. 2 proceeds as follows. As data estimates from adder 14 of the long equalizer are supplied to decision circuit 40, output values are supplied over line 69 corresponding to the values of actual data capable of being transmitted, the values being determined by decision circuit 40 in accordance with a prescribed algorithm, such as a closest value, or a simple polarity, identity as noted previously. For purposes of providing a simplified example, the present description will treat the case where the transmitted data is of a simple binary format, such as a series of ones and zeroes represented by respective positive and negative voltage levels, such as $+1.0$ and $-1.0$ volts.

Thus, a series of digital values of data estimates from the long equalizer might represent the voltage levels $+0.38$ v, $-0.75$ v, $+0.05$ v, $-0.40$ v, etc., which, using a simple polarity criterion, would provide the binary values 1, 0, 1, 0, etc., at the output of decision circuit 40. These values are shifted, or loaded, sequentially into register 41 under the control of clock pulses on line 75. Immediately subsequent to a shift enabling clock pulse on line 75, a reset or clear signal is applied over line 61 to clear or reset to zero the contents of each stage of up-counter register 53. After a data estimate decision value has been shifted into the first stage of register 41, (the contents of the other stages having been shifted down to the immediately adjacent stage with the contents of the last stage having been dumped, and up-counter register 53 having been cleared) multiplier 42 multiplies the contents of register 41 by the values stored in weight register 45, updated through previous cycles of operation, and the products are summed in adder 44. The sum output of adder 44 on line 44-0 is compared in subtractor 50 with the data estimate on line 68 and the difference between the two is supplied as an error signal on line 67.

During the arithmetic operation carried out by units 42, 44, and 50, delay circuit 56 delays the reset signal and applies the same over line 65 to OR gate 59, which supplies an enable signal on line 64 to registers 58 and 60. Upon being enabled, register 58 stores the error signal on line 67 while count register 60 stores the all zero or cleared contents of up-counter register 53. Comparator 57 then compares the error value from subtractor 50 with the same error value stored in register 58. Since the two error values are identical (corresponding to the equalizer output error where the contents of up-counter register 53 are all zeroes), no enabling signal is generated in line 66. (For this first comparison, the generation of an enable signal on line 66 is not detrimental in any event since the intended error value would be loaded in register 58.) During this time, the error signal on line 67 is also applied to gain adjust circuit 47 and the scaled error is used in the correlation process carried out by multiplier 43 and adder 46. However, until a carry signal is generated by up-counter 53, a load signal will not be applied to weight register 45 so that its weighting coefficients are not yet changed.

Upon completion of the above operation, a counter control clock pulse is supplied to OR gate 51 from a high speed clock source over line 76. This high speed clock pulse increases the contents of register 53 by a count of one. Thus, in the present example, assuming up-counter register 53 is a three bit counter register, its contents change from 000 to 100, the one bit being the least significant bit. Since the contents of register 41 have now changed, due to the increase in the contents of the central stage group (up-counter register) 53, the operation of arithmetic units 42, 45, and 50 will produce a new error signal to be compared with the contents of minimum error register 58. If the new error exceeds the value of the error stored in register 58, comparator 57 generates no output on line 66, so that an enable signal is not applied via OR gate 59 over line 64 to registers 58 and 60 and their respective contents remain unchanged. However, should the error value at the output of subtractor 50 be less than the value stored in minimum error register 58, comparator 57 will generate an output on line 66 and cause the new error value to be loaded into register 58 and, at the same time, cause the present value (100), stored in up-counter register 53, to be stored in count register 60.

The above-described sequence of operations of increasing the contents of register 53, error signal generation, comparison and comparison-dependent loading of register 58 and 60 are repeated for each subsequent high speed clock pulse until up-counter register counts up through capacity (111 for the three-binary stage register in the present example) and generates a carry as it recycles to zero (000). The generation of a carry signal is used to load register 53 with the contents of register 60 and to enable the updating of the contents of weight register 45. The carry signal also sets flip-flop 82 to inhibit the application of further high speed clock pulses over line 76 until flip-flop 82 is reset by the next clock control signal on line 75. Thus, with the contents of register 60, corresponding to that set of decision values for the central group 53 of the stages of storage register 41 which produce a minimum error signal at the output of subtractor 50, having been loaded into register 53, multiplier units 43 and adder 47 again carry out the correlation process in accordance with the scaled error signal produced by arithmetic units 42, 44, 50, and 47. After a delay, imparted by one-shot 55, sufficient to permit these sets of calculations, a load signal is supplied over line 73 to weighting coefficient register 45 and its contents are updated based upon the minimum error-producing contents of register 41. Gate circuit 49 is also enabled by the signal on line 73, whereby the summation output of adder 44, which produced a minimum error, may be derived as the equalizer output. The delayed output from one-shot 55 is also applied to gate circuit 39 so that the minimum error contents of register 58 may be supplied to gain adjust circuit 17 of the first, or long, equalizer. With the above series of operations having been completed, the short equalizer is now ready to receive a new data estimate from the first, or long, equalizer. When a new data sample is received from adder 14, a new clock control pulse will be received over line 75, and the above series of operations will be carried out for the new data estimate.

In accordance with the technique carried out by the embodiment of the invention shown in FIG. 2, data decisions stored in register 14 are manipulated in order to minimize the error produced by the equalization process, so that, in effect, the decision-configured equalizer operates by simulating the channel itself, and then decides what was the originally transmitted data based upon the simulated effect of the channel.

In the particular implementation shown in FIG. 2, centrally located selected contents of the data storage register 41 are manipulated to minimize the error output of the equalizer for the purpose of adjusting the weighting coefficients. Modifications of this scheme may be carried out without departing from the scope and intent of the present invention. For example, rather than adjust the contents of preselected, centrally located data values stored in register 41, the second equalization process may involve the manipulation of the contents of each stage of register 41. In this latter case, the output of adder 14 may be coupled directly to the first stage of register 41 and the entirety of register 41 may be comprised of an up-counter register. Of course, the capacity of each of registers 58 and 60 is changed accordingly, to accomodate a change in the length of the data word being manipulated.

Figure 3:
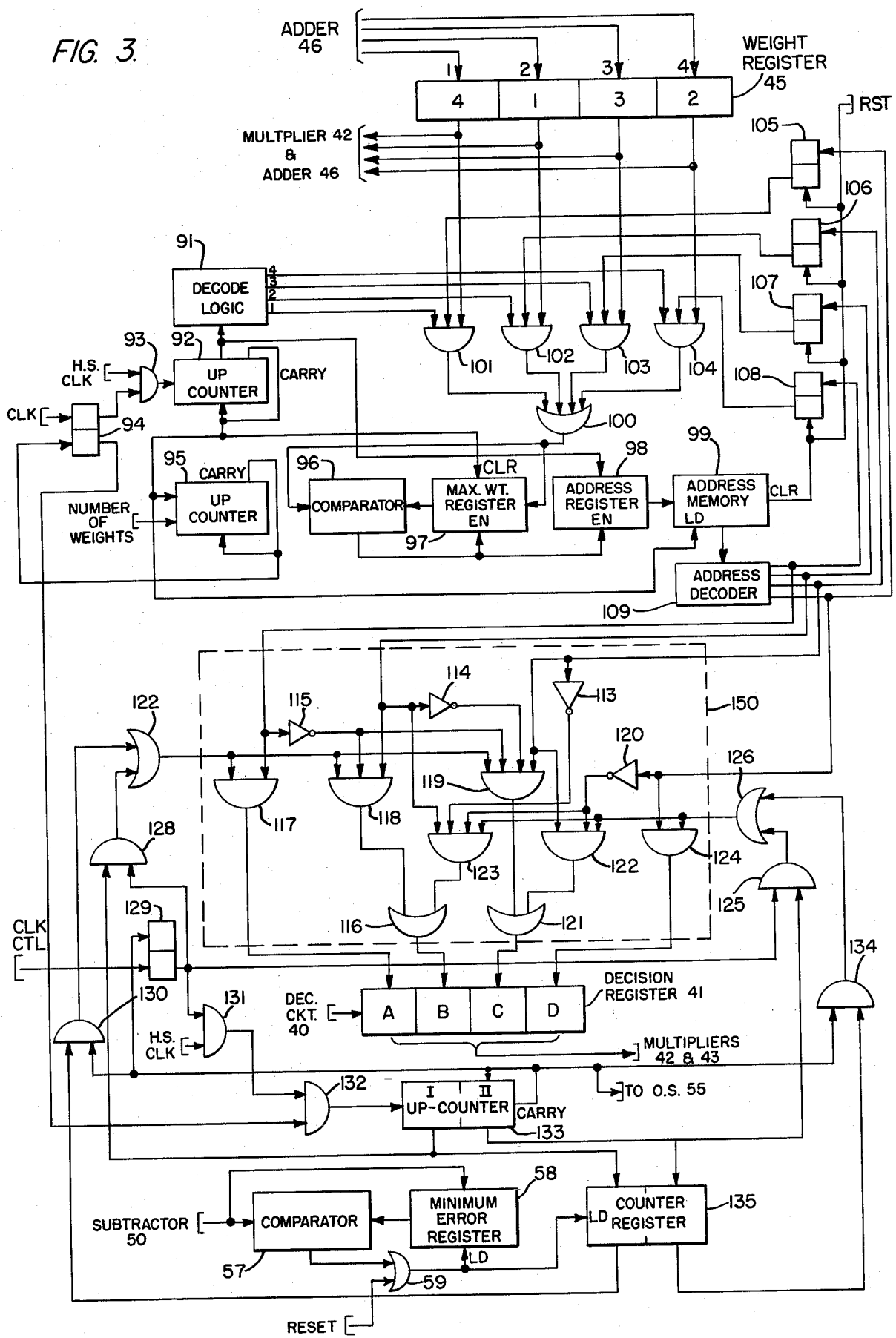
FIG. 3 is a schematic block diagram of a second embodiment of a decision-configured equalizer which may be used for the second or short equalizer in the cascaded equalizer arrangement shown in FIG. 1.

As a further modification, the contents of selected stages of register 41 may be selected based upon the magnitudes of the corresponding weight values stored in register 45. Since it is the relatively larger or higher magnitude coefficients which are subject to the greatest degree of variation, a maximum valued weighting coefficient scheme may be used as the criterion for manipulating the contents of storage register 41. A circuit configuration for implementing this latter scheme is shown in FIG. 3.

In order to simplify the illustration of this further embodiment of the invention, weight register 45 and decision register 41 have been depicted as having four stages. It will be appreciated, however, that the number of stages of each register is not so limited but may be any number consistent with the teachings of the invention. In addition, in the example described, it will be assumed that the minimum error technique of the present invention will be based upon those two stages of the decision register 41 for which corresponding stages of the weighting coefficient register 45 have the greatest weight values. For the purpose of determining which two stages of weight register 45 have the largest weight values, the contents of weight register 45 are coupled through gates 101–104 and coupling gate circuit 100 to comparator 96. As was the case with the circuits shown in FIGS. 1 and 2, the signal-value-coupling lines shown in FIG. 3 may represent a plurality of conductor leads as necessary to couple signals between elements. Thus, although the first stage of register 45 is shown as being coupled via a single line to an AND gate 101 and OR gate 100 to comparator 96, it is to be recognized that the gate configuration illustrations used in the figure are for purposes of simplifying the drawing and for concisely depicting the configuration of this particular embodiment. Where the contents of each stage of a register are defined by a plurality of bits, a corresponding plurality of bit conductor leads (for parallel data transfer) will be coupled to an appropriate number of gate circuits to permit data transfer, the plural gate circuits being represented in FIG. 3 by a single gate circuit.

For sequentially addressing each gate 101-104 to enable the coupling of the contents of the stages of weight register 45 to comparator 96, up-counter 92 and decode logic circuit 91 are provided. Up-counter 92 is coupled via AND gate 93 to receive high speed clock pulses and counts these pulses as they are received and recycles after counting up to its storage capacity. For the example shown, where weight register 45 is composed of four coefficient storage stages, counter 92 counts from 0 to 4 and recycles to 0. Decode logic 91 contains straightforward combinational logic for decoding the count stored in counter 92 into selective address signals for enabling one of gate circuits 101-104. A second control input of each of gate circuits 101-104 is coupled to a respective one of flip-flops 105-108, respectively. Flip-flops 105-108 are used to selectively inhibit the transfer of the contents of register 45 to comparator 96, depending upon which stage or stages of weight register 45 have been determined to contain the greatest weight or weights. Flip-flops 105-108 are selectively latched by address decode signals from address decoder 109 in response to the contents of an address memory 99. Address memory 99 is loaded with the address of one of the stages of weight register 45 at the end of each scan of its contents carried out by counter 92 and decode logic circuit 91. Namely, the carry output of up-counter 92 is coupled to the load or enable control input of address memory 99 to store therein the contents of address register 98. Address register 98 is coupled to receive the count output of counter 92, corresponding to the address of a respective stage of register 45 and address register 98 is controllably enabled by the output of comparator 96 to replace its address contents with the count output of counter 92. Comparator 96 is also coupled to maximum weight register 97 and generates an output to enable each of registers 97 and 98, upon the contents of register 97 being determined to be less than the contents of the stage of register 45 being addressed and supplied to comparator 96. At the end of each weight register scan cycle, the carry output of counter 92 clears register 97.

The carry output of counter 92 is further coupled to the count input of counter 95 which counts carry signals from counter 92 up to a preset number. (In the present example, up-counter 95 is preset at two.) The carry signal generated by counter 95, upon recycling, is applied to the reset input of flip-flop 94, thereby preventing further high speed clock pulses from being applied via AND gate 93 and terminating further counting by counters 92 and 95 until flip-flop 94 is set by the next clock control signal.

The above-described circuitry portion of FIG. 3 constitutes a maximum weight detection circuit, the operation of which is used to determine which stages of decision register 41 are to be varied for minimizing equalizer error output. Before describing the configuration and operation of the lower portion of FIG. 3, which relates to the control of the manipulation of the contents of decision register 41, a description of the operation of the maximum weight detector circuit will be presented.

As was explained in connection with the description of FIG. 2, after the contents of the weighting coefficient register 45 are updated at the end of an equalization cycle, a new data sample is supplied to the data storage register of the long equalizer and a new data estimate is supplied from adder 14 to the short equalizer, with the occurrence of a new control clock signal. This control clock signal is applied to the set input of flip-flop 94, so that AND gate 93 is enabled and can pass high speed clock pulses to up-counter 92. To provide a working illustration of the maximum weight detection circuit, let it be assumed that the relative weight values stored in the four stages of weight register 45 are as shown in FIG. 3; namely, the first stage has the highest weight value, the second stage has the lowest weight value, the third stage has the second highest weight value, and the fourth stage has the second lowest weight value, as determined by the output of adder 46 and loaded into register 45 at the end of the immediately preceding equalizer cycle.

Initially, each of flip-flops 105-108 will have been reset and address memory 99 cleared by a reset (RST) signal. Also, register 97 was cleared by the previous carry from counter 92. With each of flip-flops 105-108 being reset, none of gate circuits 101-104 is inhibited. Therefore, when up-counter 92 counts the first high speed clock pulse after AND gate 93 becomes enabled, the contents of counter 92 advance from zero to one, and decode logic 91 supplies an enable signal to gate circuit 101, so that the first stage of weight register 45 is effectively addressed and the weight coefficient value stored therein is supplied to comparator 96 and to register 97. Since weight register 97 has been cleared, comparator 96 detects that the weighting coefficient value supplied via gate circuit 100 is greater than the contents of register 97 and supplies an enable signal to each of registers 97 and 98. Weight register 97 is loaded with the contents of the addressed first stage of weight resiger 45 and address register 98 is loaded with the count of counter 92 corresponding to the address of the first stage of register 45.

At the next high speed clock pulse, up-counter 92 advances one digit and enables gate circuit 102, to thereby read out the contents of the second stage of weight register 45 and supply these contents via gate count 100 to comparator 96. Since comparator 96 detects that the contents of weight register 97 (corresponding to the weighting coefficient stored in the first stage of register 45) exceed that supplied by gate circuit 102, comparator 96 does not generate an enable output signal and the contents of registers 97 and 98 remain unchanged. For the next two high-speed clock pulses, counter 92 advances from two to three and from three to four, respectively, and decode logic circuit 91 selectively enables gate circuits 103 and 104 to apply the contents of the third and fourth stages of register 45 to comparator 96. On each occasion, comparator 96 will generate no output, so that the contents of registers 97 and 98 remain unchanged.

Upon receipt of the next high-speed clock pulse, up-counter 92 generates a carry as it recycles to zero. This carry signal causes up-counter 95 to advance one digit, clears the contents of weight register 97 and loads the address stored in address register 98 into address memory 99. The address now loaded into memory 99 is decoded by address decoder 109 as corresponding to that of the first stage of weight register 45. Address decoder 109 generates an output signal which sets flip-flop 105 and thereby disables gate circuit 101. When up-counter 92 advances from zero to one at the next high-speed clock pulse, decode logic circuit 91 supplies an enable signal to gate circuit 101. However, since flip-flop 105 has been set, gate circuit 101 is disabled and the contents of the first stage of register 45 are not applied to comparator 96. Comparator 96 compares the cleared contents of register 97 with zero at its other input and supplies no enable signal to registers 97 and 98.

At the next high-speed clock pulse, up-counter 92 advances from one to two and addresses the second stage of weight register 45 by enabling gate circuit 102. Gate circuit 102 has not been disabled by flip-flop 106, since the latter is still reset, so that the contents of the second stage of weight register 45 are applied to comparator 96. Comparator 96 detects that the weight value of the second stage of register 45 is greater than the cleared contents of register 45, so that an enable signal is applied to each of registers 97 and 98. Register 97 is thus loaded with the contents of the second stage of register 45 while address register 98 is loaded with the present count of counter 92 corresponding to the address of the second stage of register 45.

At the next high-speed clock pulse, the contents of up-counter 92 advance from two to three and decode logic 91 enables gate circuit 103, so as to couple the contents of the third stage of weight register 45 to comparator 96. Comparator 96 detects that the contents of the third stage of register 45 are greater than the contents of register 97 (since the weight coefficient stored in the third stage of register 45 is the second highest of the four stages, while that stored in the second stage of register 45 is the lowest of the four stages) and supplies an enable signal to maximum weight register 97 and address register 98. Register 97 is loaded with the contents of the third stage of register 45, while register 98 is loaded with the address of the third stage. When decode logic 91 addresses gate circuit 104 at the next high-speed clock pulse, comparator 96 detects that the contents of the fourth stage of register 45 do not exceed the contents of register 97, so that no enable signal is supplied to registers 97 and 98 and their contents remain unchanged. At the next high-speed clock pulse, counter 92 generates a carry signal as it recycles to zero, causing address memory 99 to be additionally loaded with the contents of address register 98 corresponding to the address of the third stage of weight register 45. Address decoder 109 thereby also sets flip-flop 107, disabling gate 103. The carry signal from counter 92 is also counted by counter 95 and is again used to clear the contents of register 97. Since up-counter 95 has counted two carry signals from counter 97, corresponding to the number of weights set to control its count capacity, counter 95 generates a carry signal which resets flip-flop 94, thereby disabling AND gate 93 and preventing the counting of further high-speed clock pulses by up-counter 92. The operation of the maximum weight coefficient detection circuit portion of FIG. 3 is thereby terminated and the addresses of those stages of weight coefficient register 45 which contain the two largest-valued weights are stored in address memory 99. These addresses also represent the addresses of corresponding respective stages of decision register 41, shown as being a four-stage register in the lower portion of FIG. 3.

The respective stages of decision register 41 have their inputs coupled via a combinational logic arrangement 150, comprised of gate circuits and inverter circuits 113-124 to selectively address those stages of decision register 41 as identified by the decoded address outputs of address decoder 109. In the example described, stages A and C of register 41, corresponding to the first and third stages of weight register 45, are addressed. The outputs of the respective stages of register 41 are coupled to multipliers 42 and 43 as shown in FIG. 2. The first stage, or stage A, of register 41 is coupled to receive the decision outputs from decision circuit 40 (FIG. 2). Comparator 57 and minimum error register 58 of the second equalizer (shown in FIG. 2) are also shown in FIG. 3. In place of count register 60, however, the embodiment of the invention shown in FIG. 3 includes a counter register 135 which, in the example given, is a two-stage register, the number of stages corresponding to the selected number of stages of weight register 45. The inputs of counter register 135 are coupled to counter 133, the contents of which are also coupled to gate circuits 125 and 128. The outputs of the two stages of register 135 are respectively coupled to gate circuits 130 and 134. The outputs of gate circuits 125, 128, 130, and 134 are coupled via gate circuits 127 and 126 to combinational logic 150 to be loaded into selected stages of decision register 41 in accordance with the address designations from address decoder 109. Gate circuits 130 and 134 are enabled by the carry output of counter 133, which counts high-speed clock pulses coupled via AND gates 131 and 132. AND gate 132 is further connected to the reset output of flip-flop 94, while AND gate 131 is connected to the reset output of flip-flop 129. The set input of flip-flop 129 is connected to the carry signal output of counter 133, and its reset input is coupled to receive the control clock signal. The reset output of flip-flop 129 is also coupled to respective inputs of gate circuits 125 and 128.

The operation of the minimum error determining circuitry portion of FIG. 3 is similar to that carried out by the configuration of FIG. 2 and proceeds as follows. As was explained previously, upon a determination of which stages of weight register 45 contain the highest selected number of weighting coefficients (the highest two in the example given) address decoder 109 supplies address signals to combinational logic 150 and thereby selectively addresses stages A and C of register 41. When flip-flop 94 was reset upon the generation of a carry by counter 95, AND gate 132 became enabled to pass high-speed clock pulses to counter 133. Flip-flop 94 was originally reset by the control clock signal, so that AND gate 131 is enabled. As up-counter 133 now proceeds to count high-speed clock pulses, the contents of its respective stages increase and are coupled to register 135 and, via enabled gate circuits 125 and 128 and gate circuits 126 and 127, to combinational logic 150 and the selectively addressed stages of decision register 41, so that the contents of stages A and C of register 41 vary in the same manner as the contents of stages I and II, respectively, of counter 133. As the contents of stages A and C of register 41 are varied, the equalization process carried out by weight register 45, multiplier 42, and adder 44 proceeds just as in the embodiment of FIG. 2 and subtractor 50 supplies an error signal to comparator 57. Again, as was the case with the embodiment of FIG. 2, comparator 57 compares the error signal from subtractor 50 with the contents of minimum error register 58 and generates a load or enable signal if the output of subtractor 50 is less than the contents of register 58, so that the contents of registers 58 and 135 may be updated.

When up-counter 133 counts up to capacity and generates a carry signal, flip-flop 129 is set, thereby disabling gate circuits 125 and 128, so that the zero contents of counter 133 cannot be loaded into registers A and C. However, gate circuits 130 and 134 now become enabled and the value of stages A and C which produced a minimum error, which value is stored in register 135, is rewritten into stages A and C, and the weights of register 45 are adjusted in the same manner as described for the embodiment in FIG. 2, thus completing one cycle of operation of the second equalizer. The above process begins again with the next control clock signal accompanying a new data sample.

As will be appreciated from the foregoing description of the invention, the tracking of fast dispersive fades in a system wherein slowly varying parameters are compensated can be achieved by cascading equalizers of different loop gains and different lengths. The configuration of the second, or short, high loop gain equalizer may be such that it operates in accordance with a standard transversal inverse filter approach, or it may be decision-configured. In the latter instance, manipulation of selected ones or all of the data estimates may be effected to minimize output error and thereby refine the weighting coefficients.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

I claim:

1. A method for equalizing a sequence of electrical signals subjected to distortion during transmission, comprising the steps of:

providing first and second multistage equalizers having a first prescribed number of stages and a second prescribed number of stages, respectively;

applying said electrical signals to said first multistage equalizer so as to store therein a series of electrical signals of said sequence and producing therefrom a first equalized output representative of a transmitted signal estimate;

storing, in said second multistage equalizer, a series of values corresponding to actual values of electrical signals capable of being transmitted and established in accordance with a series of first equalized outputs of said first equalizer, and producing therefrom a second equalized output;

comparing said second equalized output with a reference value and generating therefrom an error signal; and adjusting weighting coefficients of said first and second equalizers in accordance with said error signal.

2. A method according to claim 1, wherein said first prescribed number of stages exceeds said second prescribed number of stages.

3. A method according to claim 1, wherein said second multistage equalizer has a loop gain higher than that of said first multistage equalizer.

4. A method according to claim 1, further including the steps of varying selected ones of said series of values stored in said second multistage equalizer to thereby minimize said error signal, and wherein said adjusting step comprises adjusting the weighting coefficients of said second multistage equalizer in accordance with said minimized error signal.

5. A method according to claim 4, wherein said varying step includes the step of varying a selected number of said series of values stored in said second multistage equalizer for which the weighting coefficients are largest.

6. A method according to claim 4, wherein said varying step includes the step of varying a selected number of immediately sequential ones of said series of values stored in said second multistage equalizer.

7. A system for equalizing a sequence of electrical signals subjected to distortion during transmission, comprising:

a first multistage equalizer having a first prescribed number of stages storing therein a series of electrical signals of said sequence and producing therefrom a first equalized output representative of a transmitted signal estimate;

a second multistage equalizer having a second prescribed number of stages storing therein a series of values corresponding to actual values of electrical signals capable of being transmitted and established in accordance with a series of first equalized outputs of said first equalizer, and producing therefrom a second equalized output;

means for comparing said second equalized output with a reference value and generating therefrom an error signal; and means for adjusting weighting coefficients of said first and second equalizers in accordance with said error signal.

8. A system according to claim 7, wherein said first prescribed number of stages exceeds said second prescribed number of stages.

9. A system according to claim 7, wherein said second multistage equalizer has a loop gain higher than that of said first multistage equalizer.

10. A system according to claim 7, wherein said second multistage equalizer includes means for varying selected ones of said series of values stored therein so as to minimize said error signal and means for adjusting the weighting coefficients of said second equalizer in accordance with said minimized error signal.

11. A system according to claim 10, wherein said varying means includes means for varying a selected number of said series of values stored in said second multistage equalizer for which the weighting coefficients are largest.

12. A system according to claim 10, wherein said varying means includes means for varying a selected number of immediately sequential ones of said series of values stored in said second multistage equalizer.

13. A system for equalizing a sequence of electrical signals subjected to distortion during transmission, comprising:

a first multistage equalizer having a first prescribed number of stages storing therein a series of electrical signals of said sequence and producing therefrom a first equalized output;

a second multistage equalizer having a second prescribed number of stages storing therein a series of the first equalized outputs produced by said first equalizer, and producing therefrom a second equalized output;

means for comparing said second equalized output with a reference value and generating therefrom an error signal; and means for adjusting weighting coefficients of said first and second equalizers in accordance with said error signal; and wherein said first prescribed number of stages exceeds said second prescribed number of stages; and said second multistage equalizer includes means for varying selected ones of the first equalized outputs stored therein so as to minimize said error signal, and means for adjusting the weighting coefficients of said second equalizer in accordance with said minimized error signal.

* * * * *